US 6,657,660 B2

(12) United States Patent
Shiota et al.

(10) Patent No.: US 6,657,660 B2
(45) Date of Patent: Dec. 2, 2003

(54) SYSTEM FOR STORING AND UTILIZING PICTURE IMAGE DATA RECORDED BY DIGITAL CAMERA

(75) Inventors: Kazuo Shiota, Tokyo (JP); Norihisa Haneda, Saitama-ken (JP); Shigekazu Fukada, Tokyo (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/988,782

(22) Filed: Nov. 20, 2001

(65) Prior Publication Data

US 2002/0032909 A1 Mar. 14, 2002

Related U.S. Application Data

(63) Continuation of application No. 08/975,111, filed on Nov. 20, 1997.

(30) Foreign Application Priority Data

Nov. 20, 1996  (JP) .............................. 8-309324

(51) Int. Cl.⁷ .......................... H04N 5/76; H04N 5/907; H04B 1/38
(52) U.S. Cl. ...................... 348/231; 348/232; 348/233; 348/222; 348/714; 348/229; 455/566
(58) Field of Search ................................ 348/231, 232, 348/233, 222, 229, 552, 714, 211; 707/200–206; 709/217–219; 455/566

(56) References Cited

U.S. PATENT DOCUMENTS

| 4,456,931 A | | 6/1984 | Toyoda et al. | |
|---|---|---|---|---|
| 4,714,962 A | * | 12/1987 | Levine | 348/64 |
| 5,235,680 A | * | 8/1993 | Bijnagte | 707/10 |
| 5,438,359 A | | 8/1995 | Aoki | |
| 5,525,957 A | * | 6/1996 | Tanaka | 348/220 |
| 5,539,450 A | * | 7/1996 | Handelman | 725/1 |
| 5,633,678 A | * | 5/1997 | Parulski et al. | 348/232 |
| 5,737,491 A | * | 4/1998 | Allen et al. | 704/270 |
| 5,768,633 A | * | 6/1998 | Allen et al. | 396/2 |
| 5,805,214 A | * | 9/1998 | Nishizawa et al. | 348/231 |
| 5,806,005 A | * | 9/1998 | Hull et al. | 455/566 |
| 5,841,471 A | * | 11/1998 | Endsley et al. | 348/231 |
| 5,903,309 A | * | 5/1999 | Anderson | 348/333 |
| 5,905,528 A | * | 5/1999 | Kodama | 348/220 |

FOREIGN PATENT DOCUMENTS

JP   06268582   9/1994

* cited by examiner

Primary Examiner—John Miller
Assistant Examiner—Paulos M Natnael
(74) Attorney, Agent, or Firm—Birch, Stewart, Kolasch & Birch, LLP

(57) ABSTRACT

Pictures recorded by a digital camera can be stored and utilized by a method convenient and appropriate for the situation. The system comprises variety of means for transferring picture image data recorded by a variety of digital cameras to an image server installed in a DPE or the like and a variety of accessing means for enabling the picture image data stored in the image server to be accessed.

12 Claims, 3 Drawing Sheets

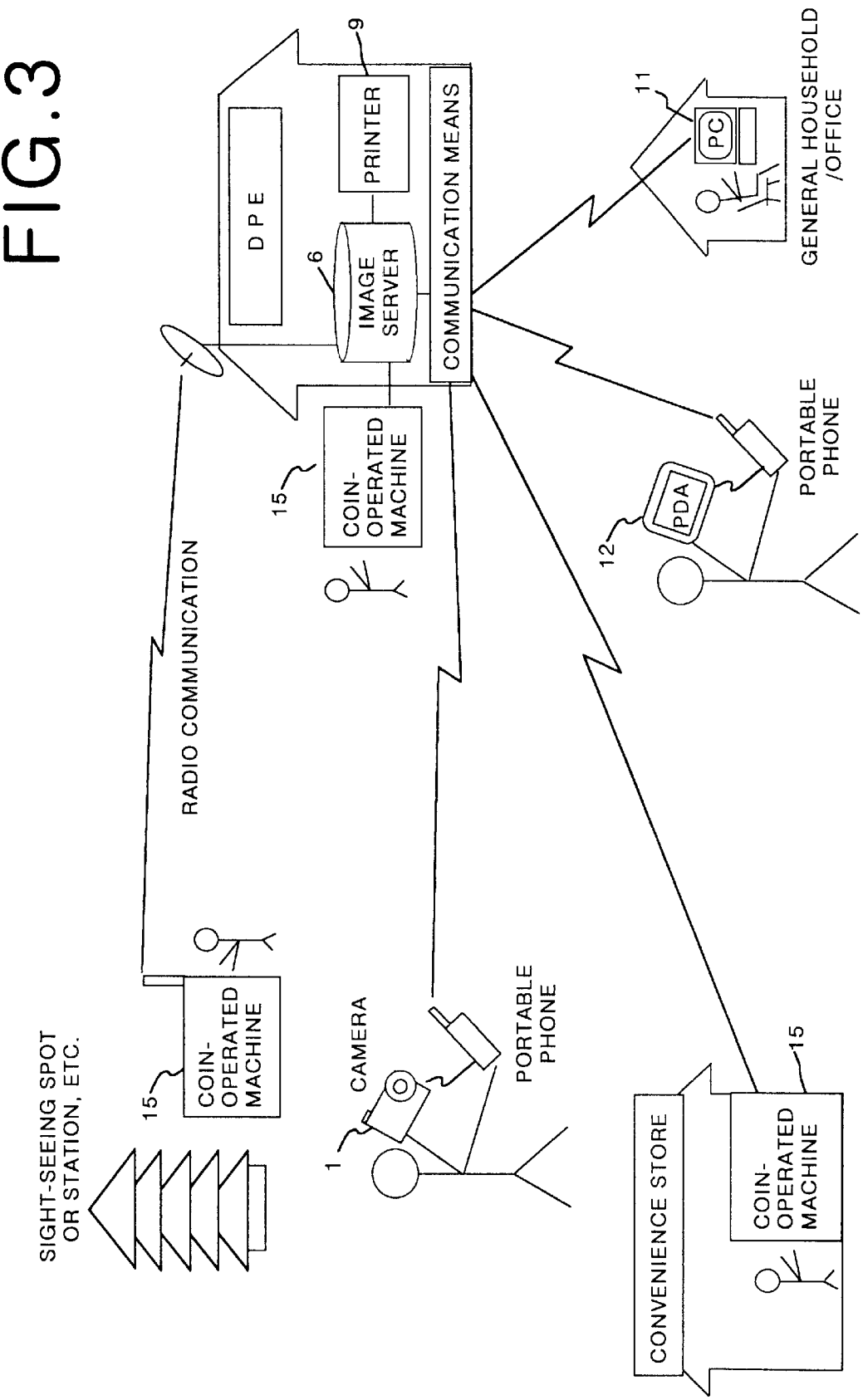

SYSTEM FOR STORING AND UTILIZING PICTURE IMAGE DATA RECORDED BY DIGITAL CAMERA

This application is a continuation of co-pending application Ser. No. 08/975,111, filed on Nov. 20, 1997, the entire contents of which are hereby incorporated by reference and for which priority is claimed under 35U.S.C. §120; and this application claims priority of Application No. 8-309324 filed in JAPAN on Nov. 20, 1996 under 35 U.S.C. §119.

BACKGROUND OF THE INVENTION

1. Field of the Invention

The present invention relates to a picture image storing and utilizing system wherein picture image data recorded by a digital camera are stored in a large capacity disc of a server computer installed in a minilab, DPE or the like, and the stored picture image data are utilized later by printing or downloading them.

2. Description of the Related Art

Following the rapid spread of personal computers and personal digital assistants (PDA) recently, there has been a growing demand for utilizing a picture image recorded by a user as digital image data. As a service provided by laboratories or DPE's to meet the demand, a digital output service has been known which records image data in a photo CD or in a large capacity floppy disc and returns it to a customer when a film, on which image data has been recorded, is deposited for developing by the customer. Alternatively, a network photograph service wherein image data are stored in a server computer installed in a laboratory or in a DPE so that a customer can request download of the image data via the Internet or the like has been proposed.

Meanwhile, in the case of digital cameras, digital image data can be obtained directly by recording, without involving a DPE. Therefore, image data recorded by digital cameras are generally stored and managed by individuals. In other words, a user of a digital camera generally records picture images by using the digital camera, and transfers the picture image data within the memory of the digital camera into a hard disc of a personal computer or the like when the memory becomes full.

Several methods have been used for transferring picture image data from a digital camera to a personal computer. In the case where the digital camera used for recording stores picture image data recorded thereby in the built-in memory thereof, a data transfer can be carried out by connecting the digital camera with a personal computer using a predetermined interface cable. As the method similar to the above, camera loading transfer device wherein a table which has a predetermined contact is connected to a personal computer using a cable and image data are transferred from a digital camera to the personal computer via the contact by loading the digital camera on the table has been implemented. This is a so-called docking station or a camera station, and the camera station CS-36 by Canon Inc. is an example of such camera stations.

In the case where a digital camera stores picture image data recorded thereby in a removable medium such as a memory card, the picture image data can be transferred from the digital camera to a personal computer using a reading apparatus such as a card reader. Furthermore, in the case where a digital camera belongs to a PDA or a digital camera has a communication function, image data can be transferred to a personal computer via a modem and a public telephone line (including portable phones). Moreover, some digital cameras can transfer image data via infrared communication.

As described above, storage and utilization of picture image data recorded by a digital camera implicitly assumes that a user of a digital camera has a personal computer. Furthermore, the fact that subsequent recording cannot be carried out unless image data are transferred to a personal computer when the memory of a digital camera becomes full means that a personal computer should be carried with a digital camera.

However, the rate of ownership of portable notebook type personal computers is not high, even though personal computers have become wide spread recently. Even if a user has a notebook type personal computer, it is not realistic for the user to carry the computer with him/her during a trip only for storing image data of a digital camera. Furthermore, even if the user carries the computer with him/her, it is possible that recorded picture images cannot be transferred due to the disc space of the computer becoming full.

On the other hand, it is not necessary to carry a personal computer if a plurality of memory cards are available and can be exchanged in the same manner as films of an ordinary camera. However, memory cards are far more costly than films, and the maintenance cost of a digital camera would become very high if a plurality of memory cards were necessary.

SUMMARY OF THE INVENTION

Therefore, implementation of a method which can store and utilize pictures recorded by a digital camera more easily and at a lower cost has been desired. Based on consideration of the problems described above, the object of the present invention is to provide a picture image data storing and utilizing system which enables even a user who does not have a personal computer at hand or at all to use a digital camera easily and to store or utilize picture images recorded by a digital camera.

A first picture image data storing and utilizing system of the present invention comprises an image server which stores picture image data, at least one medium reading means which transfers picture image data, recorded by a digital camera and stored in a removable medium, to the image server by reading the removable medium, and accessing means which enables the picture image data stored in the image server to be accessed and utilized.

A second picture image data storing and utilizing system of the present invention comprises, instead of the medium reading means of the first system, at least one data transferring means for transferring the picture image data, recorded by a digital camera and stored in the built-in memory of the digital camera from the digital camera to the image server.

Furthermore, a third picture image data storing and utilizing system of the present invention comprises the image server, the accessing means, the medium reading means, and the data transferring means.

In addition to each of the device mentioned above, a picture image data storing and utilizing system of the present invention may comprise file outputting means which outputs picture image data stored in the image server as a file in a predetermined recording medium, or print outputting means which outputs picture image data stored in the image server as prints.

"The image server" herein referred to means, for example, a server computer which is installed in a DPE or a laboratory or the like, and has a large capacity disc which is sufficient for storing picture image data of customers.

"The removable medium" herein referred to means, for example, a memory card or the like inserted in a digital camera. "At least one medium reading means which transfers picture image data recorded by a digital camera and stored in a removable medium to the image server by reading the removable medium" means a card reader and a cable to connect the card reader with the image server, for example. "The data transferring means" refers to a cable interface, a docking station, and a communication line as described above, for example. The communication channel means not only means using wires but also includes using other methods of date transfer such as radio infrared communication or a portable phone for example.

"Enables the picture image data stored in the image server to be accessed and utilized" means, for example, to utilize all kinds of services having been carried out at a DPE or having been proposed as a network photograph service, such as the case where the image data are browsed, searched for, downloaded, ordered for a print, output in a floppy disc or the like, and transferred to a specified apparatus.

"The accessing means" is meant to include not only communication equipment and channels which make an access from a personal computer or a PDA via a network possible, but also other things such as a monitor and inputting means, including a keyboard and a touch panel for example, which are both connected directly to the image server. The software to be installed in the server computer, that is, the software whereby a request for a service is received, and picture image data are displayed, searched for, and transferred in response to the request, and by which an outputting apparatus such as a printer is controlled, obviously may be included as part of the accessing means.

Furthermore, if picture image data in the memory card of a digital camera have file names such as 0001.JPG, 0002.JPG, 0003.JPG and so on in the order of recording, it is possible that the file names are exactly the same as file names of picture image data transferred from another digital camera, when the picture image data are transferred to the image server under the original file names. Therefore, it is preferable that the picture image storing and utilizing system of the present invention further comprises file name assigning means for assigning a file name which is used for storing the image data in the image server and different from the file name of the image data before the image data are transferred to the picture image data transferred to the image server.

More specifically, means for determining a file name using the camera code to identify the digital camera used for recording the image data, the possessor code representing the possessor of the digital camera, the date code representing the date of recording, or the like, is possible. A variety of information used to determine such a file name may be input with a keyboard when the image data are transferred.

Some digital cameras add the date of recording or the like to picture image data as recording property information, and store the picture image data together with the recording property information in built-in memories or memory cards. In this case, a file name may be determined automatically by reading such recording property information, without requesting a user to input the information.

Each means described above may exist as an individual apparatus. However, it is preferable to store all means in a frame so that the frame can be placed at a counter of a DPE, at a sightseeing spot, at a convenience store or a station, for example. In this case, all means including the image server may be stored in a frame. However, since the picture image data stored in the image server are the property of a customer and to be stored securely, it is preferable that the image server is separately placed in a DPE or the like and only the inputting system such as a card reader and/or a cable interface is stored in one frame in order to be placed at different locations.

In this case, a temporary storage server which controls input and stores input image data temporarily is obviously stored in such a frame. Transfer means for transferring the image data temporarily stored in the temporary storage server is also included in the frame. Furthermore, not only the inputting system but also file outputting means and print outputting means may also be included in the frame.

In this case, a data transfer will be carried out between the image server and the frame having the variety of picture image data inputting/outputting means. This transfer may be carried out from the temporary storage server to the image server via a communication channel or the like, after image data are temporarily stored in the temporary storage server which carries out input/output control of the card reader installed in the frame, for example. Alternatively, if the frame is placed outside, radio may be used for the transfer. Any known method which has been used usually can be adopted as the transfer method.

In other words, "at least one medium reading means which transfers picture image data recorded by a digital camera and stored in a removable medium to the image server by reading the removable medium" or "at least one data transferring means for transferring the picture image data recorded by a digital camera and stored in the built-in memory of the digital camera from the digital camera to the image server" means, for example, to include any necessary equipment and means for transferring the obtained image data to the image server, such as a card reader, a docking station, the temporary storage server, a modem, a transceiver, a cable, and a telephone line.

By comprising the data transferring means for transferring picture image data recorded by a digital camera to the image server installed in a DPE or the like, and accessing means for enabling the digital image data stored in the image server to be accessed, the picture image data storing and utilizing system of the present invention can store picture image data by using a method which is convenient and appropriate for the situation, regardless of the type of digital camera or whether or not the user carries or possesses a personal computer, and can utilize the picture image data in various methods.

If the customer-system interface portion (such as a card reader) is implemented by storing the interface portion in a frame, such as a coin-operated machine and the communication between the coin-operated machine and the other portion of the system (such as the image server) is carried out by radio, for example, it is convenient for both service providers and customers, since costly equipment and important data are strictly managed at a DPE while the equipment for the interface portion can be placed as an unmanned service machine in DPEs, sightseeing spots, convenience stores, stations or the like.

BRIEF DESCRIPTION OF THE DRAWINGS

FIG. 3 is a diagram showing advantageous results of the present invention.

DESCRIPTION OF THE PREFERRED EMBODIMENT

Figure 1:
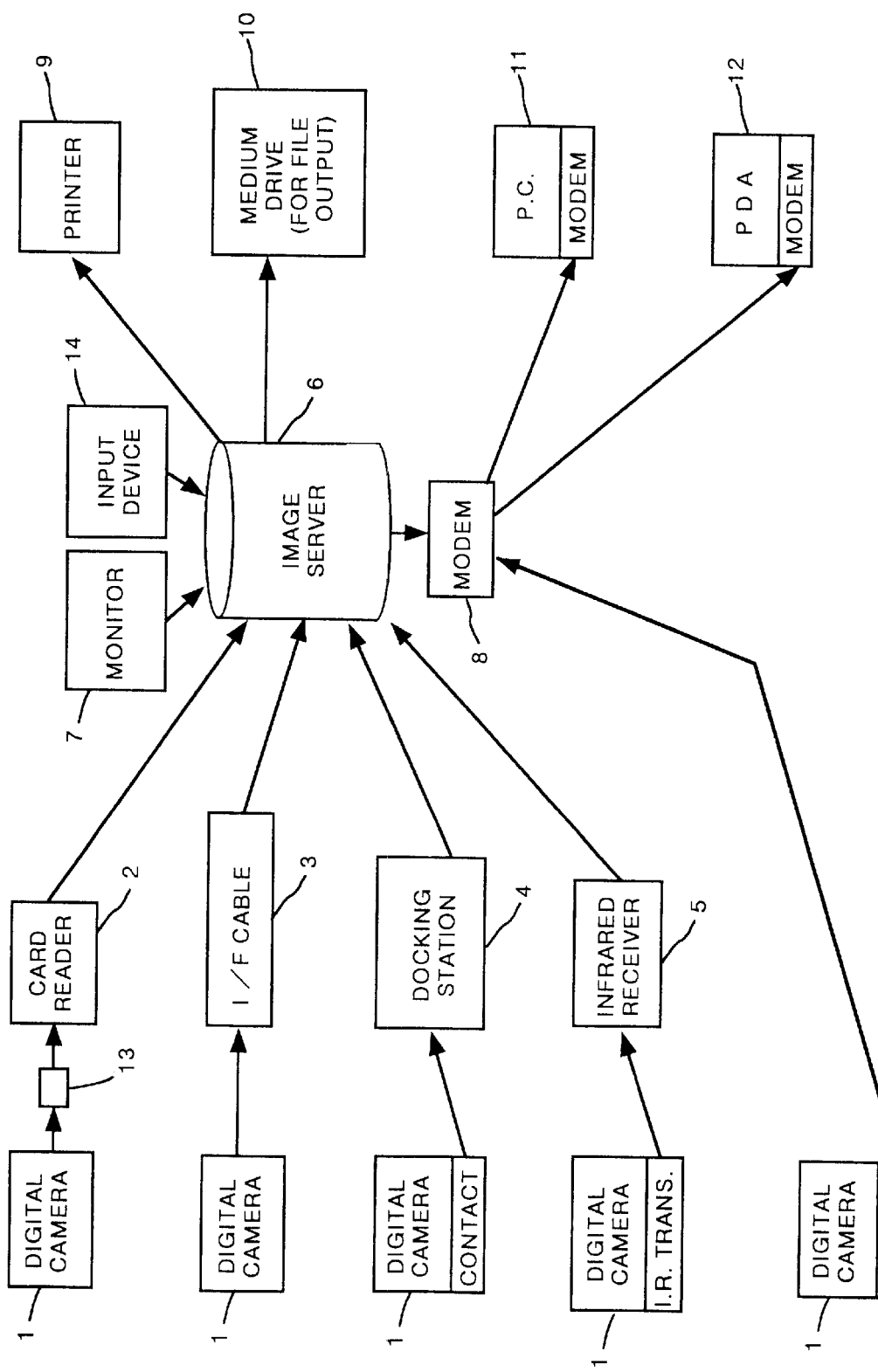
FIG. 1 is a diagram showing an outline of a picture image data storing and utilizing system of the present invention.

Hereinafter, a picture image data storing and utilizing system of the present invention will be explained referring to the accompanying drawings. FIG. 1 is a diagram showing an outline of the picture image data storing and utilizing system of the present invention. As shown in FIG. 1, the picture image data storing and utilizing system comprises a server computer 6 (an image server) having a large capacity disc, a variety of means for storing picture image data recorded by a digital camera 1 in the image server 6, and a variety of means for utilizing the picture image data stored in the image server 6.

Storage of the picture image data in the image server 6 will be explained first. It is preferable to have a plurality of picture image data storing devices so that all kinds of digital cameras, regardless of their types or manufacturers, can be dealt with by this system. More specifically, a card reader 2 is installed so that digital cameras using memory cards can be handled by this system. It is preferable to have a plurality kinds of card readers according to the standard of memory cards such as PCMCIA or SSFDC.

An interface cable 3, a docking station 4, an infrared receiver 5 and the like may also or alternatively be installed in this system as input or transfer devices so that digital cameras, which record image data in built-in memories thereof, can be dealt with. In this case, it is also preferable to have several kinds of interface cables 3 and docking stations 4 according to the standards of digital cameras, since the specifications of the interface cable 3 and the docking station 4 vary depending on the types of digital cameras.

The above devices suppose that a user of this system directly faces this system's user interface. However, it is preferable for this system to comprise storing devices by a communication channel so that picture image data can be stored without a user facing the system directly. For example, it is preferable for this system to comprise a modem 8 for transferring image data from the built-in memory of a digital camera to the image server 6 using a portable phone or the like as an alternative input or transfer device, and equipment and software which are installed in the image server 6 for allowing such an access via a communication channel.

Some digital cameras have the function of compressing picture image data to save memory space when the picture image data obtained by recording using the cameras are stored in the cameras' memories. However, the processing time for recording is shorter when no compression is carried out on the image data. Therefore, a digital camera of such a type does not necessarily compress the image data for all recordings, and a user of such a camera can often select whether or not the compression is carried out by switching a mode or the like. Therefore, the judgment as to whether or not the image data have been compressed may be carried out based upon necessity when picture image data are stored in the image server 6, and the picture image data without compression may be stored in the image server 6 after compression of the image data by the image server 6. In the case where a cable connection or a communication channel connection is used for data transfer, it is preferable to compress picture image data using a digital camera so that the time necessary for the transfer of the data becomes shorter.

To utilize the picture image data stored in the image server 6 after searching for the image data, each image data should obviously be stored in the image server under a file name different from any other file names. If the file name of the picture image data before transferred to the image server 6, that is, the file name of the picture image data stored in the built-in memory or the like of a digital camera, is a unique file name including the name of a photographer, for example, it will not cause a problem. However, a plurality of digital cameras use serial numbers or the like as the file names, and if the transfer of the image data is carried out with the file names as they are, some file names will be exactly the same.

Therefore, when the picture image data are transferred, a file name which will not have an exact match within the image server 6 and is different from the file name in the built-in memory or the like is determined, and storage of the image data is carried out under the determined file name. This file name is automatically determined according to a predetermined rule, using information input from a keyboard or recording property information added to the picture image data by the function of a digital camera.

For example, the file name can be determined by a combination of information such as the type code and the product No. code of a digital camera, the type code and the product No. code of a removable medium, the possessor code of the digital camera and the removable medium, the date of recording, the date of data transfer, the number of the transfer within a day, and the frame number in the built-in memory or in the removable medium. The file name may be determined by combining the frame number and the receipt number which is determined by combining the name of the image server and the date of data transfer for example, when the transferred picture image data are received by the image server 6.

Next, it will be explained how the picture image data stored in the image server 6 by the variety of means described above are used. As methods of using the picture image data, that is, the form of service provided to a customer, there are picture image data browsing, print ordering, file output to a predetermined medium, and data transfer by download or attachment to an electronic mail message.

One of the means for requesting the image server 6 to provide such a service comprises a monitor 7 which is directly connected to the image server 6, and an input device 14 such as a keyboard or a touch panel. It is preferable to make the image server accessible from a personal computer 11 or a PDA 12 via a communication channel. In this manner, a user can request the service, regardless of where he/she is, or regardless of whether or not he/she has a personal computer.

In order to respond to a print order requested by the variety of accessing means or to the file output service request, the system comprises a printer 9 and a medium drive 10. It is preferable that a plurality of medium drives 10 are installed for a plurality of media such as a floppy disc, an MO disc, and a Zip disc.

The outline of the picture image storing and utilizing system of the present invention has been described above, referring to FIG. 1. However, the variety of means shown in FIG. 1 are not necessarily installed at one location. Especially, when the object of the present invention, that is, to make digital cameras more easily usable, is taken into consideration, it is preferable to implement the present invention as an easily usable embodiment such as an unmanned service or self service, as is the case of an automatic vending machine, an ATM at a bank, or a fax machine at a convenience store.

Figure 2:
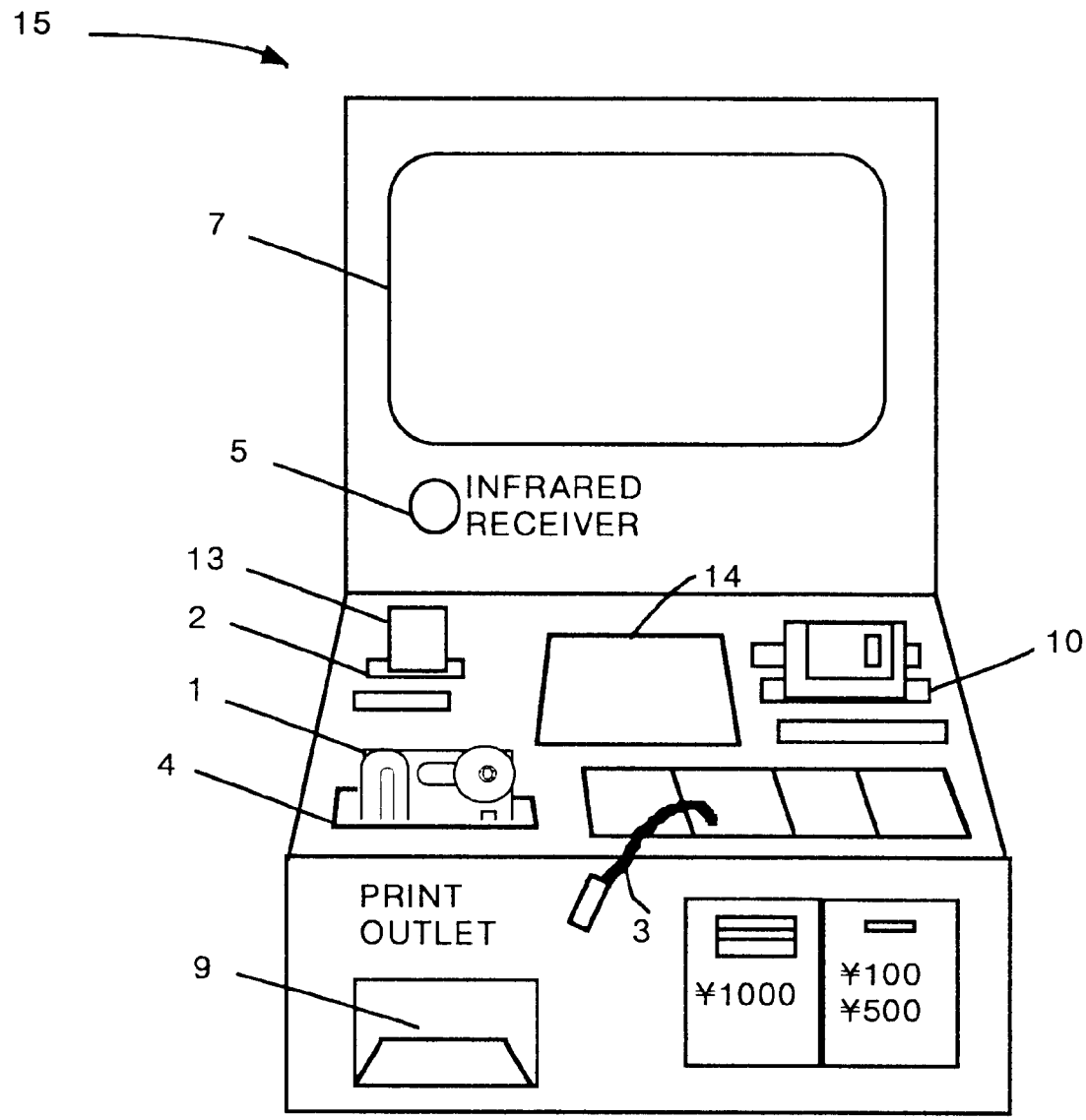
FIG. 2 is a diagram showing an example of a coin-operated machine.

For this purpose, it is preferable that the card reader 2, the interface cable 3, the docking station 4, the infrared beam receiver 5, the medium drive 10, the printer 9, the monitor 7 and the input device (such as a touch panel) 14 in FIG. 1 are all stored in one frame or unit, and placed at a station or a convenience store or the like as a coin-operated (or cash/credit card/debit card, etc.) machine shown in FIG. 2. In this manner, it becomes possible, for example, for a user to set his/her digital camera on a coin-operated machine installed in a station, and store the picture image data recorded thereby during his/her trip. Even in the case where the service is provided at a DPE in the conventional manner, 24-hour service becomes possible, since this service can be provided as an unmanned service.

However, in this case, a coin-operated machine 15 only has the function of storing the input picture image data temporarily. Therefore, periodic data transfers to the image server 6 are carried out via a communication channel or the like. It is also possible for the coin-operated machine 15 to include the image server 6 with the present system serving as a stand alone machine. However, the coin-operated machine 15 may not necessarily be protected perfectly depending on its location. Therefore, it is preferable for the image server 6 which stores important picture images of customers to be placed in a DPE or the like.

In the field of cameras using a film, an unmanned film developing service using a coin-operated locker or the like has been proposed. However, since collection and delivery of films or prints should be carried out by hand, the service can not necessarily be provided in a short time and at a low cost. On the other hand, with respect to digital cameras, a wider variety of services can be provided at a low cost, since digital cameras have an advantage in terms of cost, because of their ability to transfer picture images as data via a communication channel or the like.

FIG. 3 shows how convenient the picture image storing and utilizing system of the present invention is. In other words, FIG. 3 is a diagram to explain the advantage of the present system. Using the system of the present invention, a user can store picture image data at a plurality of places during his/her trip, for example, and it is not necessary for the user to carry his/her computer with his/her digital camera. Furthermore, data can be stored at any place and time, if a user has a digital camera having a communication function and a portable phone.

Moreover, not only at a place where a person has gone but also in his/her daily life, picture image data can be stored at any time of the day at a DPE or a convenience store or the like. On this occasion, since a service such as a print order or a image data transfer to a friend or data output to a predetermined medium can be requested using an input panel of a coin-operated machine or the like, a person who does not possess a personal computer can exchange picture image data easily with others by data transfer or file output.

A user having a personal computer can obviously enjoy such a print output or file output service described above or a data download service by accessing the image server 6 via communication means. Furthermore, if a user has a FDA 12 and a portable phone, the user can enjoy such services at any place.

As described above, the picture image data storing and utilizing system of the present invention can not only solve the inconvenience in digital camera data storage, but can also make optimal use of the feature of digital cameras, namely that picture images can be dealt with as digital image data from recording to data output.

What is claimed is:

1. A terminal for obtaining an image comprising:
   picture taking means for obtaining picture image data by taking a picture;
   recording means for recording the picture image data in a recording medium;
   transferring means for transferring the picture image data from the recording medium to an image server which stores the transferred picture image data after reading out the picture image data recorded in the recording medium;
   access means for enabling the picture image data stored in the image server to be accessed and utilized; and
   display means for displaying the picture image data obtained by taking a picture and the picture image data stored in the image server, wherein
   information is attached to the picture image data, said information being at least one of:
      recording property information, the type code of the image obtaining terminal, the product number code of the terminal, the type of the recording medium, the product number of the of the recording medium, the owner code of the recording medium, the date of recording of the picture image data, the date of transferring of the picture image data, the number of transfers of the picture image data within a day, and the frame number of the picture image data in the recording medium, wherein
      said terminal further comprises file name generating means for generating a file name of the picture image data obtained by the picture obtaining means based on at least one of the information attached to the picture image data, and assigning the file name to the picture image data.

2. A terminal for obtaining an image as defined in claim 1, wherein
   said accessing means carries out at least one of browsing, searching, downloading, print ordering, outputting to a predetermined medium, transferring to a specified apparatus or attaching to an electronic mail message of the picture image data.

3. A temporary image recording server, which is connected to an image server which stores picture image data, and temporarily records the picture image data in cases where the picture image data obtained by a digital camera is read and the picture image data is transferred to the image server, comprising
   image obtaining means for obtaining the picture image data obtained by the digital camera,
   recording means for recording the picture image data, and
   data transfer means for transferring the picture image data, read out from the recording means, to the image server, wherein
      information is attached to the picture image data, said information being at least one of: recording property information, the type code of the image transfer apparatus, the product number code of the image transfer apparatus, the type code of a recording medium used in the image transfer apparatus, the product number of the recording medium, the owner code of the recording medium, the date of recording of the picture image data, the date of transferring of the picture image data, the number of transfers of the picture image data within a day, the receipt number which is determined by combing the name of the image server and the date of data transfer, and the frame number of the picture image data in the recording medium, wherein
      said image recording server generates a file name of the picture image data received by the image obtaining means based on at least one of the information given to the picture image data, assigns the file name to the picture image data, and stores the picture image data with the file name assigned thereto.

4. A temporary image recording server as defined in claim 3, wherein said temporary image recording server is connected to the image server in a wireless manner.

5. A temporary image recorder server as defined in claim 3 further comprising at least one of: file outputting means for outputting the picture image data to a file, printing means for printing the picture image data, image search means for searching the picture image data recorded in the recording means, and input means for inputting a variety of orders.

6. A temporary image recording server as defined in claim 5, wherein said temporary image recording server is connected to the image server in a wireless manner.

7. A system for storing and utilizing picture image comprising an image server for storing the picture image data and a temporary image recording server as defined in any one of claims 3 to 6.

8. An image server comprising:

image receiving means for receiving picture image data transferred from a plurality of image transfer apparatuses;

image storing means for storing the picture image data received by the image receiving means; and access processing means for receiving access to the picture image data stored in the image store means and processing requests for use of the picture image data, wherein information is attached to the picture image data, said information being at least one of: recording property information, the type code of the image transfer apparatus, the product number code of the image transfer apparatus, the type code of a recording medium used in the image transfer apparatus, the product number of the recording medium, the owner code of the recording medium, the date of recording of the picture image data, the date of transferring of the picture image data, the number of transfers of the picture image data within a day, the receipt number which is determined by combing the name of the image server and the date of data transfer, and the frame number of the picture image data in the recording medium, wherein said image storing means generates a file name of the picture image data received by the image receiving means based on at least one of the information given to the picture image data, assigns the file name to the picture image data, and stores the picture image data with the file name assigned thereto.

9. An image server as defined in claim 8, wherein said access processing means attaches the picture image data to an electronic mail message based on a request from any one or at least one of said plurality of image transfer apparatuses.

10. An image server as defined in claim 8, wherein said image storing means compresses and stores the picture image data.

11. An image server as defined in claim 10, wherein said access processing means attaches the picture image data to an electronic mail message based on a request from any one or at least one of said plurality of image transfer apparatuses.

12. An image server as defined in any one of claims 8 to 11, wherein said image storing means searchably stores the picture image data.

* * * * *